United States Patent [19]
McCarty

[11] Patent Number: 5,883,880
[45] Date of Patent: Mar. 16, 1999

[54] DISK POSITIONING DEVICE FOR DEFINING PRECISE RADIAL LOCATION

[75] Inventor: Vincent D. McCarty, Austin, Tex.

[73] Assignee: Tamarack Storage Devices, Austin, Tex.

[21] Appl. No.: 734,711

[22] Filed: Oct. 21, 1996

Related U.S. Application Data

[63] Continuation of Ser. No. 260,359, Jun. 15, 1994, abandoned.

[51] Int. Cl.$^6$ .................................................. G11B 25/04
[52] U.S. Cl. .......................... 369/290; 369/270; 369/271; 369/282
[58] Field of Search ..................................... 369/261, 264, 369/270, 271, 282, 289, 290; 360/99.05, 99.12; 403/1

[56] References Cited

U.S. PATENT DOCUMENTS

| | | | |
|---|---|---|---|
| 2,310,545 | 2/1943 | Rieber | 369/270 |
| 3,407,405 | 10/1968 | Hoadley . | |
| 3,408,656 | 11/1968 | Lamberts . | |
| 3,578,836 | 5/1971 | Hannam | 350/3.5 |
| 3,612,641 | 10/1971 | Eaglesfield | 350/3.5 |
| 3,635,538 | 1/1972 | Caulfield et al. | 350/3.5 |
| 3,837,725 | 9/1974 | Bricot et al. | 350/3.5 |
| 3,874,785 | 4/1975 | Huignard et al. | 350/161 |
| 3,891,976 | 6/1975 | Carlsen | 340/173 LM |
| 3,912,391 | 10/1975 | Fleisher et al. | 355/54 |
| 3,989,347 | 11/1976 | Eschler | 350/3.5 |
| 3,998,521 | 12/1976 | Eschler | 350/3.5 |
| 4,032,340 | 6/1977 | Bloom et al. | 96/27 H |
| 4,038,647 | 7/1977 | Schneider | 340/173 CC |
| 4,063,226 | 12/1977 | Kozma et al. | 365/125 |
| 4,063,795 | 12/1977 | Huignard et al. | 350/3.5 |
| 4,076,370 | 2/1978 | Wako | 350/3.75 |
| 4,138,189 | 2/1979 | Huignard et al. | 350/3.64 |
| 4,166,622 | 9/1979 | Rager | 369/282 X |
| 4,175,823 | 11/1979 | Pekau et al. | 350/3.79 |
| 4,213,193 | 7/1980 | Reid et al. | 365/125 |
| 4,224,480 | 9/1980 | Satoh et al. | 179/100.3 G |
| 4,256,362 | 3/1981 | Bardos | 350/3.86 |
| 4,307,165 | 12/1981 | Blazey et al. | 430/8 |

(List continued on next page.)

FOREIGN PATENT DOCUMENTS

| | | | |
|---|---|---|---|
| 0445147 | 11/1912 | France | 369/264 |
| 2688276 | 9/1993 | France | 403/1 |
| 0395759 | 4/1991 | Japan | 369/270 |
| 4341616 | 11/1992 | Japan | 403/1 |

OTHER PUBLICATIONS

Steve Redfield, "Holographic Storage: Not a Device but a Storage Class," *SPIE*, vol. 1785, p. 45., 1992.

Ellen Muraskin, "Memory Crystal," *Popular Science*, p. 38, Aug. 1992.

Kirk Ladendorf, "MCC Spinoff Attracts Influx of Capital," *Austin American–Statesman*, Saturday, Feb. 13, 1993.

News Release of Microelectronics and Computer Technology Corporation dated Feb. 12, 1993.

Carolyn Duffy Marsan, "Holographic Memory Could Revolutionize Info Storage," *Federal Computer Week*, Mar. 25, 1991.

Andrew Pollack, "The Hologram Computers of Tomorrow," *The New York Times*, Jun. 9, 1991.

Steve Redfield and Lambertus Hesselink, "Enchanced Non-destructive Holographic Record in Strontium Barium Niobate," *Optical Society of America*, 1988.

*Primary Examiner*—William J. Klimowicz
*Attorney, Agent, or Firm*—Gregory M. Howison

[57] ABSTRACT

A spindle for providing precise radial location of a disk includes a spindle having a key that extends from one end thereof. The disk includes a hub having a shape that is similar to that of the spindle with a key notch disposed on the peripheral edge thereof that is shaped similar to that of the key in the spindle. The key has two surfaces that come together at an angle to an apex, which apex extends downward away from the spindle and radially outward. The surfaces of the key notch on the hub are longer than that of the key, such that the surfaces of the key can mate with the surfaces of the key notch and slide therealong, such that the spindle is maintained in the center of the hub.

6 Claims, 13 Drawing Sheets

U.S. PATENT DOCUMENTS

| | | | |
|---|---|---|---|
| 4,334,007 | 6/1982 | Tinet et al. | 430/270 |
| 4,336,976 | 6/1982 | Rodemann et al. | 350/3.75 |
| 4,362,806 | 12/1982 | Whitmore | 430/202 |
| 4,458,345 | 7/1984 | Bjorklund et al. | 369/103 |
| 4,532,622 | 7/1985 | Newbold | 369/271 |
| 4,550,395 | 10/1985 | Carlson | 369/103 |
| 4,636,027 | 1/1987 | Dube | 350/3.6 |
| 4,687,720 | 8/1987 | Wreede et al. | 430/2 |
| 4,739,426 | 4/1988 | Muraoka | 360/97 |
| 4,789,977 | 12/1988 | Oudenhuysen et al. | 369/109 |
| 4,799,746 | 1/1989 | Wreede | 350/3.6 |
| 4,839,250 | 6/1989 | Cowan | 430/1 |
| 4,927,220 | 5/1990 | Hesselink et al. | 350/3.64 |
| 4,961,615 | 10/1990 | Owechko et al. | 350/3.68 |
| 4,983,003 | 1/1991 | Wreede et al. | 350/3.61 |
| 5,007,690 | 4/1991 | Chern et al. | 350/3.68 |
| 5,095,375 | 3/1992 | Bolt | 359/1 |
| 5,212,572 | 5/1993 | Krantz et al. | 359/15 |

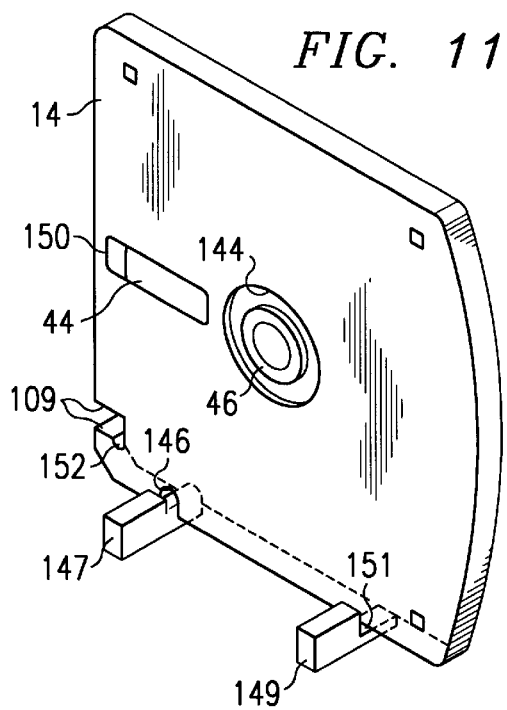
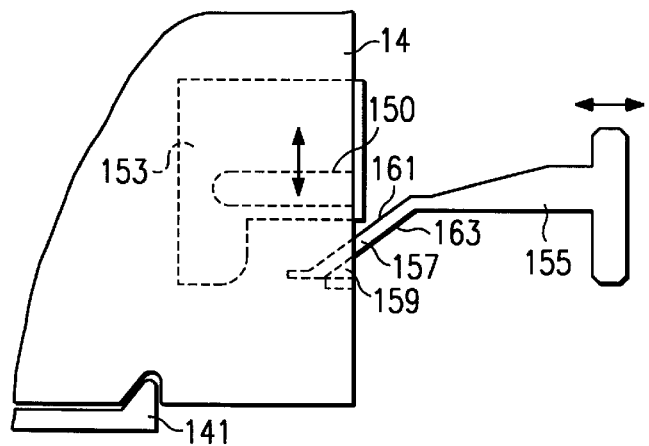
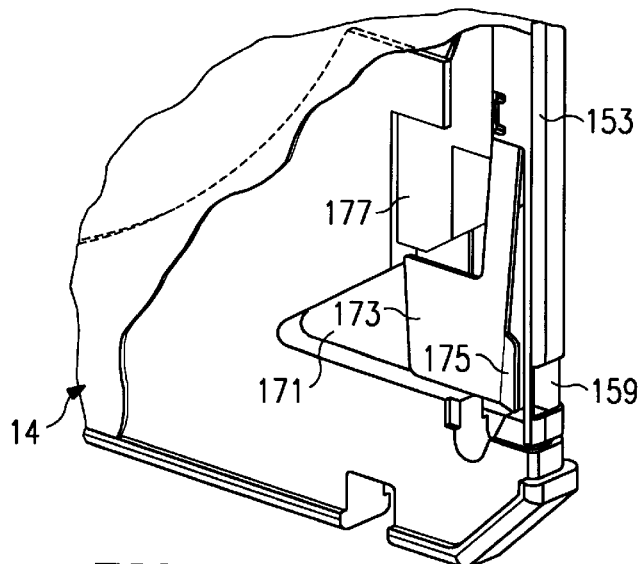

DISK POSITIONING DEVICE FOR DEFINING PRECISE RADIAL LOCATION

This application is a Continuation, of application Ser. No. 08/260,359, filed Jun. 15, 1994, now abandoned.

TECHNICAL FIELD OF THE INVENTION

The present invention pertains in general to holographic data storage devices, and more particularly, to the method and apparatus for handling multiple disk media with a single Read/Write holographic optical storage device.

CROSS REFERENCE TO RELATED APPLICATION

This Application is related to U.S. patent application Ser. No. 08/134,925, filed Oct. 7, 1993, now abandoned, and entitled "Method and Apparatus for Positioning a Light Beam on a Holographic Media" (Atty. Dkt. No. TAMA-22, 405), U.S. Pat. No. 5,519,651 filed Oct. 7, 1993, and entitled "High Capacity Holographic Storage System" (Atty. Dkt. No. TAMA-22,409) and U.S. Pat. No. 5,481,523, filed Dec. 23, 1993, and entitled "Miniature Read/Write Head for Holographic Storage" (Atty. Dkt. No. TAMA-22,454).

BACKGROUND OF THE INVENTION

As the need for increased data storage changes, the search for higher density, faster access memory technologies also increases. One of these, holographic data storage, provides the promise for increased access to higher density data. The techniques for realizing such storage typically utilize some type of storage media, such as photorefractive crystals or photopolymer layers, to store 3-D "stacks" of data in the form of pages of data. Typically, coherent light beams from lasers are utilized to perform the addressing, writing and reading of the data from the storage media by directing these beams at a specific region on the surface of the media. Writing is achieved by remembering the interference pattern formed by these beams at this region. Reading is achieved by detecting a reconstructed light beam as it exits the storage medium, the data then being extracted therefrom. Addressing is achieved by the positioning of the laser beams, and this is typically done through the mechanical movement of mirrors or lenses; however, the storage media itself can be moved relative to fixed laser beams.

There are two types of devices for positioning a data and reference beam onto a specific location within the holographic storage media, one type for positioning the media itself and one type for positioning the data and reference beam, or a combination of both types. When the media is positioned, this has the advantage of utilizing less complex optics. However, it has some disadvantages in the type of mechanism utilized to position the media in that it is mechanical and thus positioning speed is a concern. In positioning systems that rely upon optics to direct both the data beam and the reference beam, there exists some disadvantages due to the complexity of the optics. For example, if the storage media were dimensioned in a 2"×2" format, this might require optical lenses on the order of 2"–2½" in diameter. Further some care must be taken in the beam deflection systems utilized in association with an optics-only system to ensure that storage locations on the perimeter of the storage media, i.e., the extrema, are not subject to distortions, as these are probably the most difficult regions to access. Of course, a combination of the two systems could be utilized with the disadvantages of both systems being represented in the combination.

Once the optical storage media has been determined, a finite amount of storage is provided for a given form of the media, or "media magazine". However, the amount of storage area associated with a single media magazine may not be acceptable for large storage operations. This might require the use of multiple storage devices, each having its own media magazine, or the use of interchangeable media magazines with a single storage device. Alternatively, a single very large media magazine could be utilized, which is very difficult to realize. It would be more preferable to have a single storage device with Read/Write capability and multiple replaceable media magazines. These can then be inserted into the storage device on an as needed basis.

SUMMARY OF THE INVENTION

The present invention disclosed and claimed herein comprises holding and positioning a disk to a precise radial location. The apparatus includes a hub disposed at the rotational center of the disk and having a hole disposed therein with a cylindrical wall and having a key notch on the peripheral edge of one side of the cylindrical wall. The key notch has a surface that extends from a point radially outward from the associated peripheral edge to a point on the cylindrical wall of the hole. The rotatable shaft is provided for rotating to a defined radial position with a spindle disposed in the end of the shaft and having a shape substantially conforming to that of the hole and operable to be inserted into the hole from the side proximate the key notch. A key is disposed in the spindle proximate to the distal and peripheral portion, with an extended portion extending radially outward from the spindle. The extended portion has a shape that substantially conforms to the surface to slidingly engage the surface with the surface of the key notch. The key is then operable in relationship to the spindle to conform to the shape of the key notch for various positions of the spindle along the longitudinal axis of the hole and to maintain the spindle in substantially the rotational center of the hub while maintaining substantially no relative rotational movement between the spindle and the hub as the spindle reciprocates within the hub.

In another aspect of the present invention, the key notch surface is comprised of two surfaces, a first and second surface, which are flat surfaces disposed adjacent each other, such that the edges thereof form an apex with the first and second surfaces. The first and second surfaces extend from the point disposed radially outward from the associated peripheral edge to the point on the cylindrical wall of the hole. The extended portion has first and second surfaces which are longer than the first and second surfaces of the key notch with an apex formed at the edges of the first and second surfaces of the extended portion.

BRIEF DESCRIPTION OF THE DRAWINGS

For a more complete understanding of the present invention and the advantages thereof, reference is now made to the following description taken in conjunction with the accompanying Drawings in which:

FIG. 11 illustrates a perspective view of the tile for carrying the media disk;

FIG. 11a illustrates a detail of the tile and the opening of FIG. 11;

FIG. 11b illustrates a detail of the locking member on the door of the tile;

DETAILED DESCRIPTION OF THE INVENTION

Figure 1:
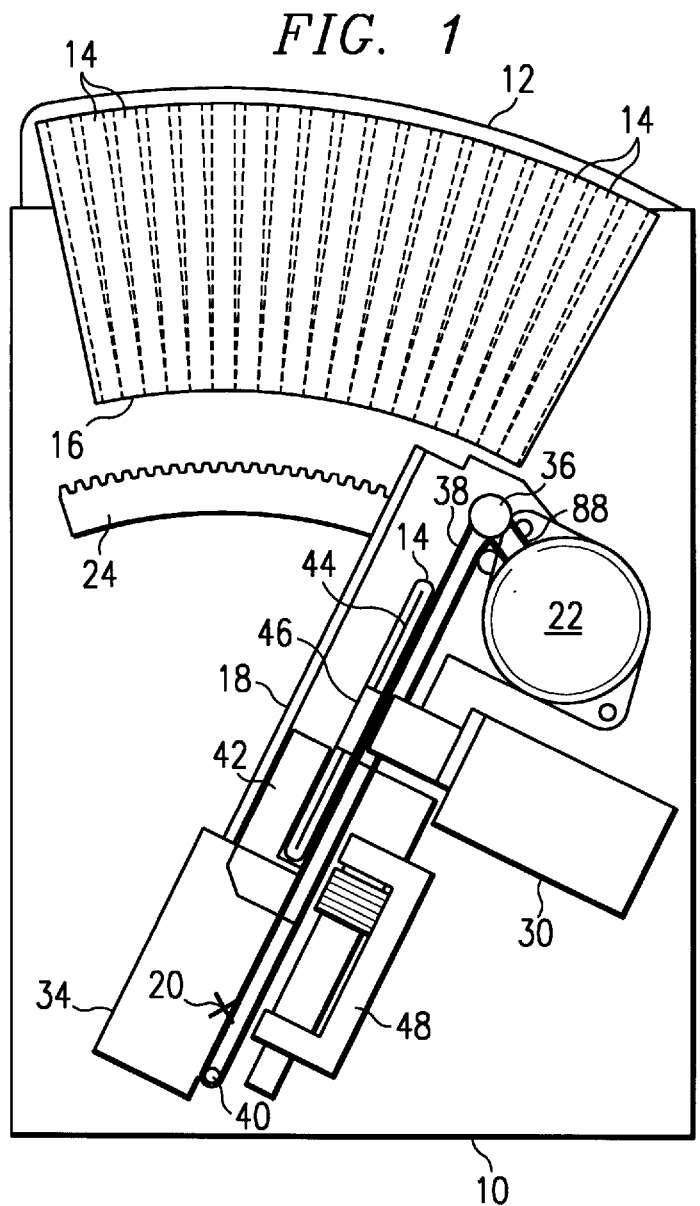
FIG. 1 illustrates a top view of the media changer of the present invention.
Figure 2:
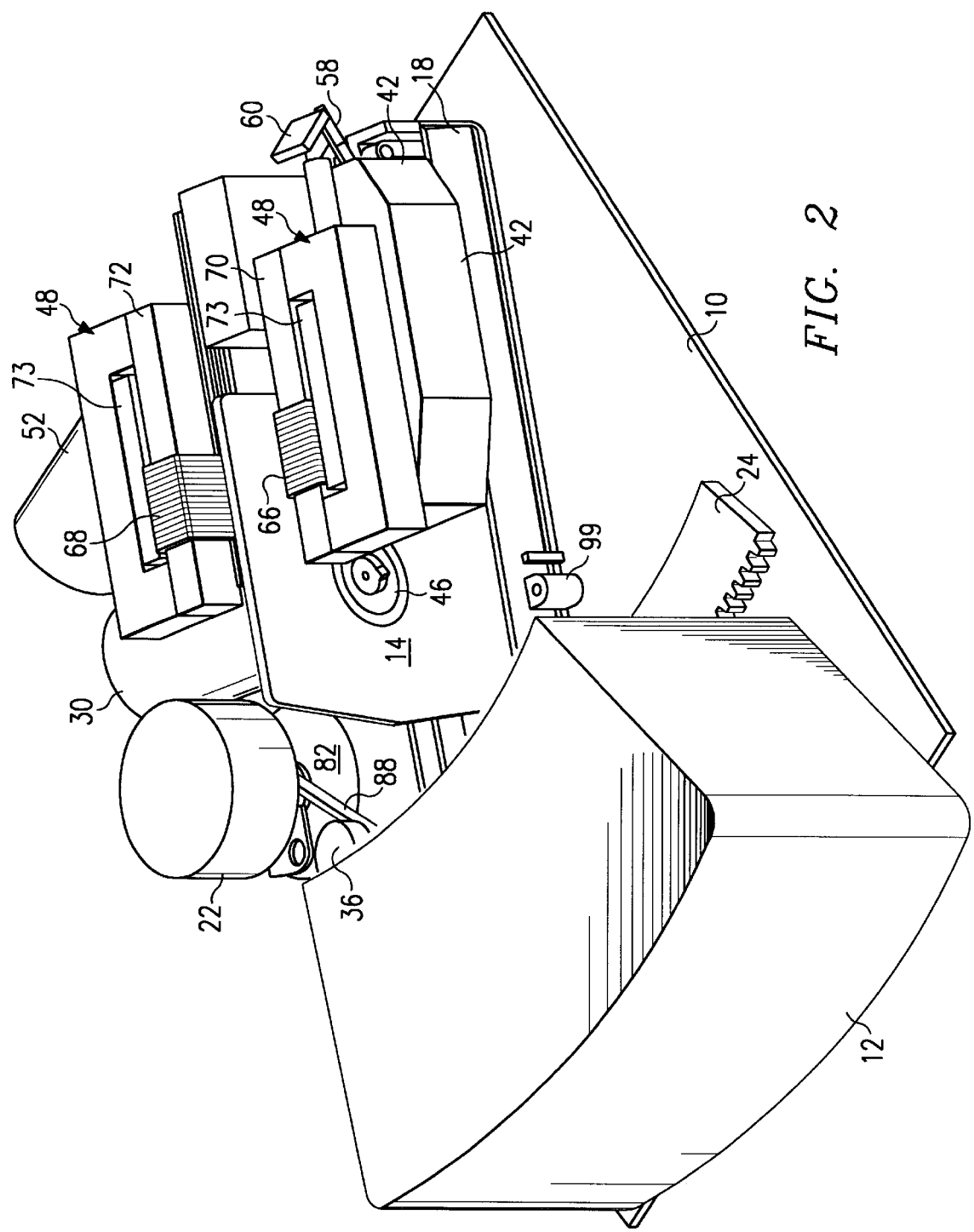
FIGS. 2–5 illustrate different perspective views of the media changer.
Figure 3:
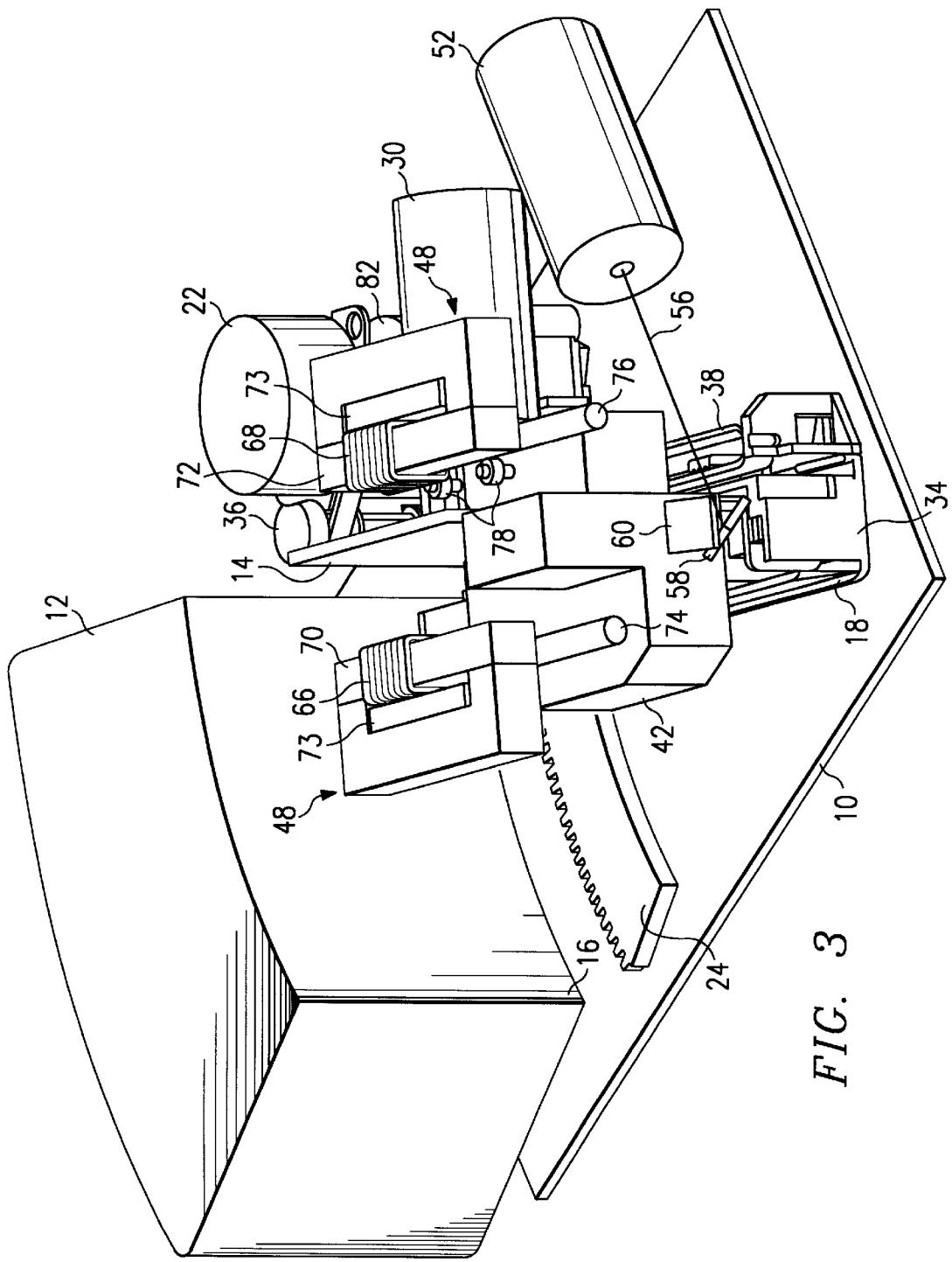
Figure 4:
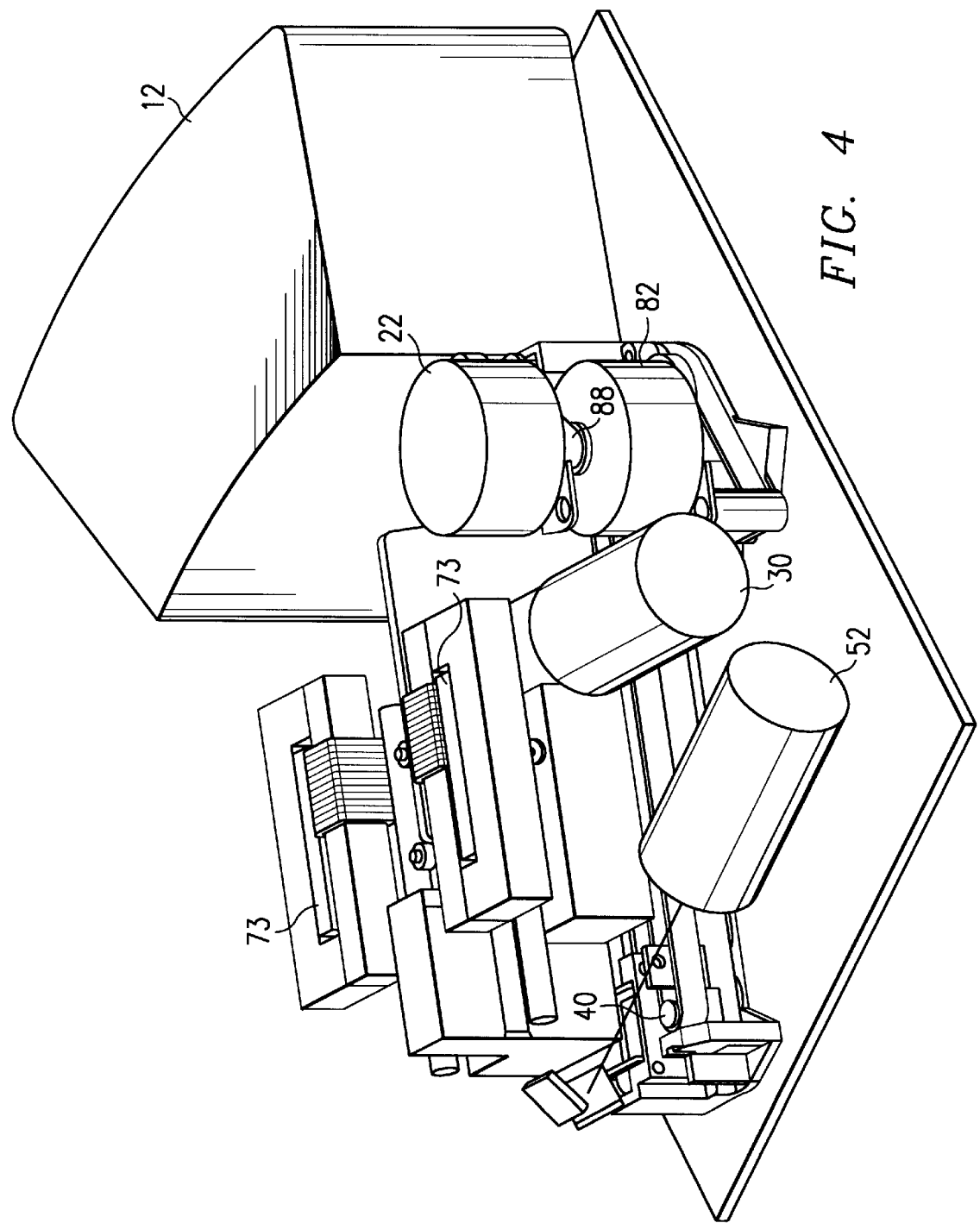
Figure 5:
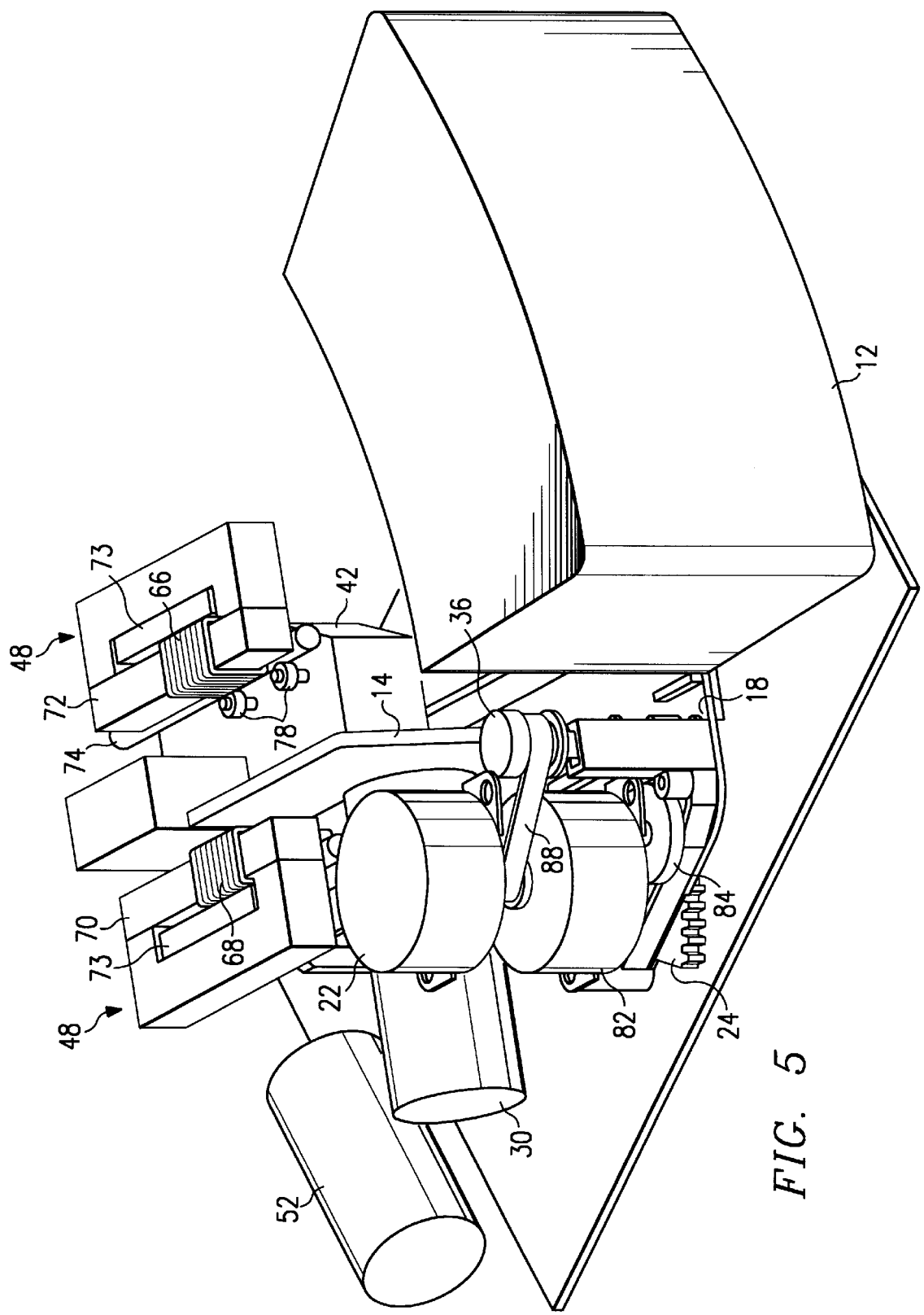

Referring now to FIG. 1, there is illustrated a top view of the media changer of the present invention. A support base 10 is provided on which an arcuate shaped tile magazine 12 is disposed, which tile magazine 12 is operable to contain a plurality of holographic media disk tiles 14, each of the tiles 14 having a holographic data storage disk contained therein. The magazine 12 has an arcuate shaped open face 16, which allows access to the tiles 14 therethrough. Although illustrated as having no upper surface, the magazine 12 has an upper surface with only the opening 16 accessible to insert the tiles 14 therein. Although not illustrated, the upper and lower surfaces and rear surfaces on the interior of the magazine 12 have rails disposed thereon which act as guides for the tiles 14, each of the tiles 14 having its own associated set of guide rails such that it is at a predetermined location within the opening 16 of the magazine 12. The tiles 14 are planar in shape with the leading edge thereof directed toward the open face 16 and the body thereof disposed in a plane parallel to the radius of the arc associated with the open face 16.

A carriage 18 is provided which is operable to pivot about a pivot point 20 on one end, the carriage 18 being longitudinal in shape. The pivot point 20 is disposed at the radial center of the arc formed in the opening 16 on the magazine 12. A stepper motor (not shown) is disposed beneath a car stepper motor 22 and is operable to drive a gear (not shown) to interact with an arcuate rack 24 fixed to base 10 having a toothed outer edge. In this manner, the distal end of the carriage 18 can be moved across the opening 16 in an arc. The distal end of the carriage 18 can therefore be disposed proximate to any one of the tiles 14 in the magazine 12 for extraction therefrom or insertion therein along the radius of the arc associated with the open face 16.

The carriage 18 is operable to be swung away from a disk spindle motor 30 to retrieve one of the tiles 14 from the magazine 12 and then swung back into position such that the extracted one of the tiles 14 and the holographic storage disk contained therein can be placed into contact with the spindle motor 30 and the spindle shaft associated therewith (not shown). In this operation, a car 34 is provided, which is operable to be reciprocated along the carriage 18 up to the opening 16 to attach via a gripper mechanism (not shown) to the exposed edge of the select one of the tiles 14 and then reciprocated back along the carriage 18 a portion of the way to the pivot point 20. This is achieved with the stepper motor 22 which drives a shaft 36 and a belt 38. The other end of the belt 38 is wrapped about an idler pulley 40 such that the car 34 can be reciprocated along the length of the carriage 18. Once the gripper mechanism grasps the edge of the tile 14, it is then pulled along the carriage 18. The carriage 18 is then rotated back into a position parallel to the spindle motor 30 and then the car 34 reciprocated toward the pivot point 20 to an engaging position such that the tile 14 can be placed in contact with the motor 30 and then a Read/Write head 42 operable to be reciprocated down about the tile 14. The tile 14 has contained therein an optical storage disk 44. The disk 44 has a hub 46 that is operable to interface with the spindle shaft on the spindle motor 30, as will be described hereinbelow. The Read/Write head 42 is operated by a magnetic reciprocating device 48.

Referring now to FIGS. 2, 3, 4 and 5, there are illustrated various perspective views of the system. In the views of FIGS. 2–5, a laser 52 is provided, which is operable to direct a coherent beam 56 towards a mirror 58. The mirror 58 is angled upward to direct the beam 56 towards a mirror 60 which again deflects the beam 56 along the direction of reciprocation of the Read/Write head 42.

The Read/Write head 42 has two coil members 66 and 68 extending on either side thereof. The coil members 66 and 68 are disposed about a portion of the reciprocating mechanism 48, this being a magnetic core 70 associated with the coil member 66, and a magnetic core 72 associated with the coil member 68. Electrical current is provided to the magnetic coils 66 and 68 through wires (not shown) that are wound about the magnetic cores 70 and 72. Permanent magnets 73 are associated with the magnetic cores 70 and 72, respectively. By varying the current, the coil members 66 and 68 can be reciprocated along the magnetic cores 70 and 72, respectively. Guide rails 74 and 76 are associated with each of the members 66 and 68, respectively, and attached to the members 70 and 72, respectively. Rollers 78 are provided for stabilizing the Read/Write head 42 against the guide rails 74 and 76.

The carriage 18 is reciprocated with a stepper motor 82 disposed beneath the stepper motor 22. The motor 82 has a reduction gear assembly 84 for driving a gear 86 (not shown) that extends downward from the carriage 18 to interact with the toothed edge of the arcuate rack 24. This provides the stepper motor 82 the ability to move the entire carriage 18 into precise alignment with one of the tiles 14 within the magazine 12. The motor 22 has a belt 88 associated therewith that is operable to interface with the shaft 36 for rotation thereof, which shaft 36 extends downward to the belt 38.

Figure 6:
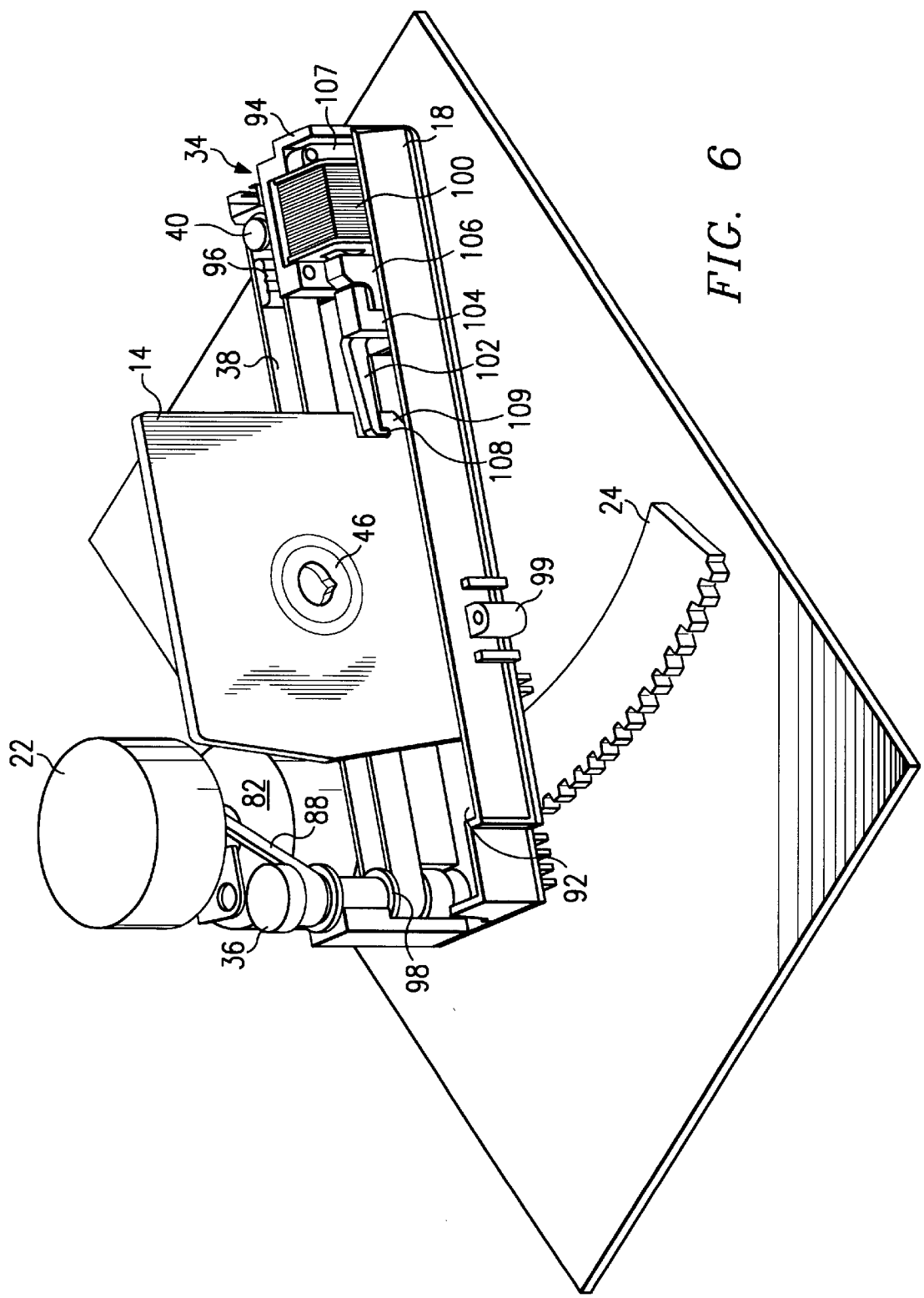
FIG. 6 illustrates a detailed perspective view of the carriage.

Referring now to FIG. 6, there is illustrated a detailed diagram of the carriage 18 and the car 34. The carriage 18, as described above, is disposed about a pivot point 20 (shown in FIG. 1) at one end of the carriage 18, and the other end thereof is operable to pivot along the arcuate rack 24. The pivoting action of the carriage 18 is controlled by the stepper motor 82. When the carriage 18 is disposed in the proper position, the car 34 is operable to traverse along a guide path 92 which is disposed along the length of the carriage 18. The car 34 is comprised of a reciprocating member 94, which is operable to slide along the path 92. The reciprocating member 94 has an L-bracket 96 (and hence car 34) extending from the side thereof and attached to one surface of the belt 38. When the belt 38 is moved, the L-bracket 96 moves along with the belt 38. The belt 38 has a toothed surface and is disposed about a toothed pulley 98, which is disposed on the shaft 36. When the belt 88 is turned by the stepper motor 22, the shaft 36 rotates and the pulley 98 rotates, thus moving or driving the belt 38. In one direction, the reciprocating member 94 will move away from the pivot point 20, and in the other direction, the reciprocating member 94 will move toward the pivot point.

Figure 6A:
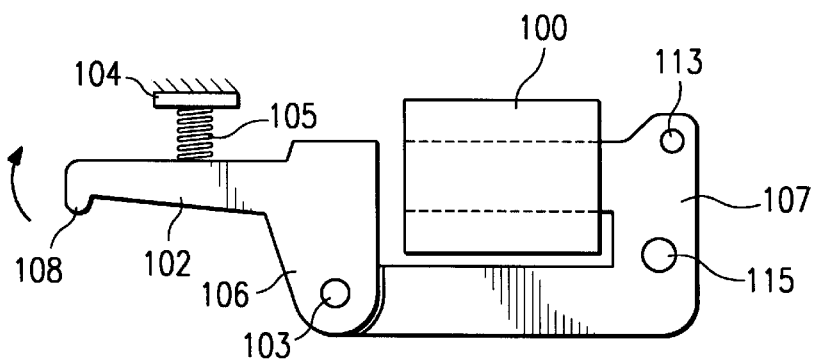
FIG. 6a illustrates a detail of the grasping mechanism.

A coil 100 is disposed about an iron yoke 107 which is mounted on the reciprocating member 94. A detail of the iron yoke 107 and the coil 100 is illustrated in FIG. 6a. The yoke 107 is attached to the reciprocating member 94 via screws through holes 113 and 115. A lever 102 is disposed on a portion of a pivoting armature 106 that is hinged to the yoke 107 with a pin 103 at the opposite end thereof to the screw holes 113 and 115, and is operable to pivot in an upward motion. At the most distal end of the lever 102 is disposed a protrusion or hook 108. A bracket 104 has a spring 105 associated therewith, which spring 105 is disposed between the bracket 104 and the upper portion of the lever 102. Therefore, whenever the coil 100 is activated, this will complete a magnetic path and force the pivoting armature 106 clockwise, thus reciprocating the hook 108 upward. The spring 105 will force the hook 108 downward when the coil 100 is deactivated.

In operation, the coil 100 is activated to move the lever 102 upward and then the reciprocating member 94 moved down along the path 92. When it reaches the end of its path, it is controlled such that it is positioned with the hook 108 disposed in a slot 109 on the tile 14, the tile 14 still disposed within the magazine 12. The coil 100 is then deactivated such that the lever 102 relaxes and reciprocates downward through the action of the spring 105. This allows the hook 108 to be disposed in the similarly shaped portion of the slot 109 in the tile 14. The reciprocating member 94 is moved backward toward the pivot point 20 urging the tile 14 outward from magazine 12 and along path 92 such that it can thereafter be disposed in contact with the spindle motor 30. A protective door (not shown) will normally cover the opening to the slot 109, which door has been removed in the illustration of FIG. 6 for simplicity. Also, a locking member on the door is disengaged by a bayonet (not shown) which is an integral part of the car 34, and which is described herein.

A tile guide (not shown) is disposed about the tile 14 and anchored on a mounting surface 99. This structure will be described in more detail hereinbelow. In general, the tile guide is operable to hold the upper portion of the tile 14 within the carriage 18 along the path 92. The carriage 18 is operated to only partially move the tile 14 along the path 92 toward the pivot point 20. The tile 14 is only moved partway along the path 92 such that when the carriage 18 is again rotated back toward the spindle motor 30 (not shown) the tile 14 will clear the Read/Write head 48. The tile 14 is then pulled into the Read/Write head to a position such that the hub 46 is aligned with the rotational center thereof disposed in line with the longitudinal axis of the spindle motor. As will be described hereinbelow, when the tile 14 is pulled into the head, it is not fully disposed against the spindle shaft 111 and the spindle motor 30. Once pulled fully within the head 48, the carriage 18 is then rotated fully such that the hub 46 fully "seats" itself against the spindle shaft 111 on the spindle motor 30. This will be described in more detail hereinbelow.

Figure 7:
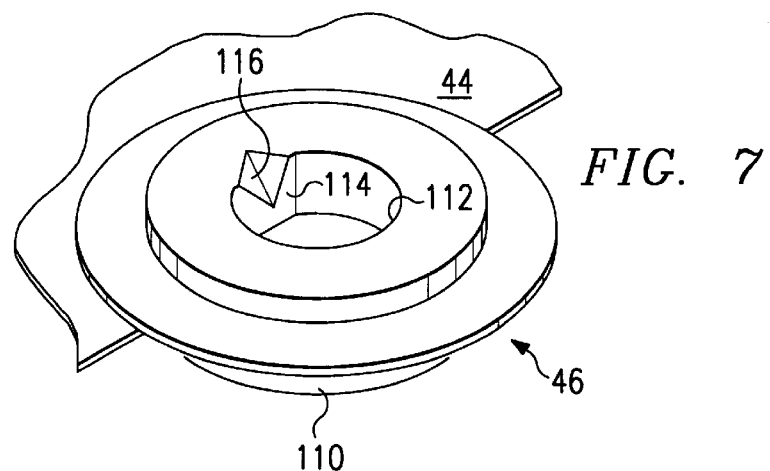
FIG. 7 illustrates a detail of the hub for the disk.

Referring now to FIG. 7, there is illustrated a detail of the disk 44, which is disposed within the tile 14. The disk 44, as described above, is fabricated from a layer of holographic storage material disposed on a substrate, which will be described in more detail hereinbelow. The substrate with the holographic storage material disposed thereon is supported in the center thereof by the hub 46. The hub 46 is formed of a rigid material which is slightly thicker than the thickness of the disk 44. The hub is cylindrical-shaped with a hollow center 112, which is also cylindrical-shaped with a "flat" 114 disposed on one side thereof, the flat 114 providing means for registration, and a two-facet "wedge-shape" surface to provide a key surface 116 of the hub which is referred to as a "key notch". It is noted that the key surface 116 has an apex formed between the two flat surfaces that extend from a point on the outer surface of the hub 46 to a point on the interior of the flat 114.

Figures 8A, 8B, 8C:
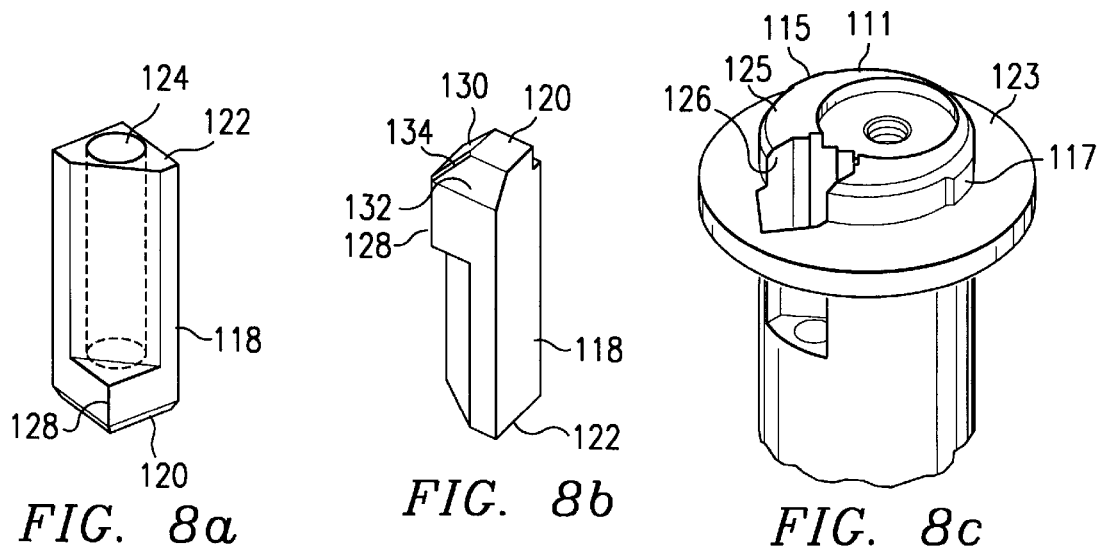
FIGS. 8a, 8b and 8c illustrate a detail of the key that is disposed in the spindle shaft of the spindle motor.

Referring now to FIGS. 8a and 8b, there are illustrated details of a key 118 that is adaptable to be disposed within a spindle shaft 111 of the spindle motor 30. The key is a longitudinal member having a top end 120 and a bottom end 122. The bottom end 122 is disposed downward into the spindle shaft 111 of the spindle motor 30 and has a spring hole 124 disposed therein. The spring hole 124 is operable to receive a spring (not shown) interior thereto and interface with a surface interior to the spindle shaft 111 of the spindle motor 30, which spindle shaft 111 is illustrated in FIG. 8c. The spindle shaft 111 has a slot 126 disposed therein that is operable to receive the key 118 therein. The key 118 is disposed such that a forward protrusion 128 is oriented outward from the shaft 111. The protrusion 128 has on the upper surface thereof two faces 130 and 132 that are disposed at such an angle to form a corner having a break surface 134 disposed therebetween, which is operable to not provide a sharp corner or apex. The two faces 130 and 132 are adaptable to be interfaced with the key surface 116, the break surface 134 ensuring that the two faces 130 and 132 will contact the two surfaces of the key surface 116. Since the key 118 is spring-loaded, it will therefore "float" axially in the slot 126. The method of retention of the key 118 in shaft 111 will be described herein below.

The spindle shaft 111 has a collar 123 disposed on the end thereof that is operable to be disposed adjacent the surface of the hub 46 adjacent the opening 112. A cylindrical protrusion 125 extends upward from the collar 123 and is adaptable to be disposed in the opening 112. Two protrusions 115 and 117 extend outward from the outer walls of the protrusion 125 at an angle of 120° relative to each other and the opening 126. Whenever the spindle shaft 111 is disposed within the opening 112 of the hub (FIG. 7), there will be an exact registration of the spindle shaft 111 with the media hub 46. As such, exact positioning of a radial column on the surface of the media 44 can be achieved. This is the result of the key 118 "sliding" upward along the key surface 116 forcing the key 118 upward into the key surface 116 and the protrusion 125 into the opening 112 such that protrusions 115 and 117 contact the inner surface of opening 112, this providing a very "tight" fit with virtually no rotation possible. It is important to note that the two surfaces of the key surface 116 are in contact with the two faces 130 and 132 on the key 118, thus preventing any rotation of the hub 46 relative to the spindle shaft 111 to maintain positioning of the disk. Additionally, the key is forced toward the rotational center of the spindle shaft 111. The effect is of driving a wedge between the disc hub 46 and the spindle shaft 111 to create a tight, repeatable interface.

Figure 9:
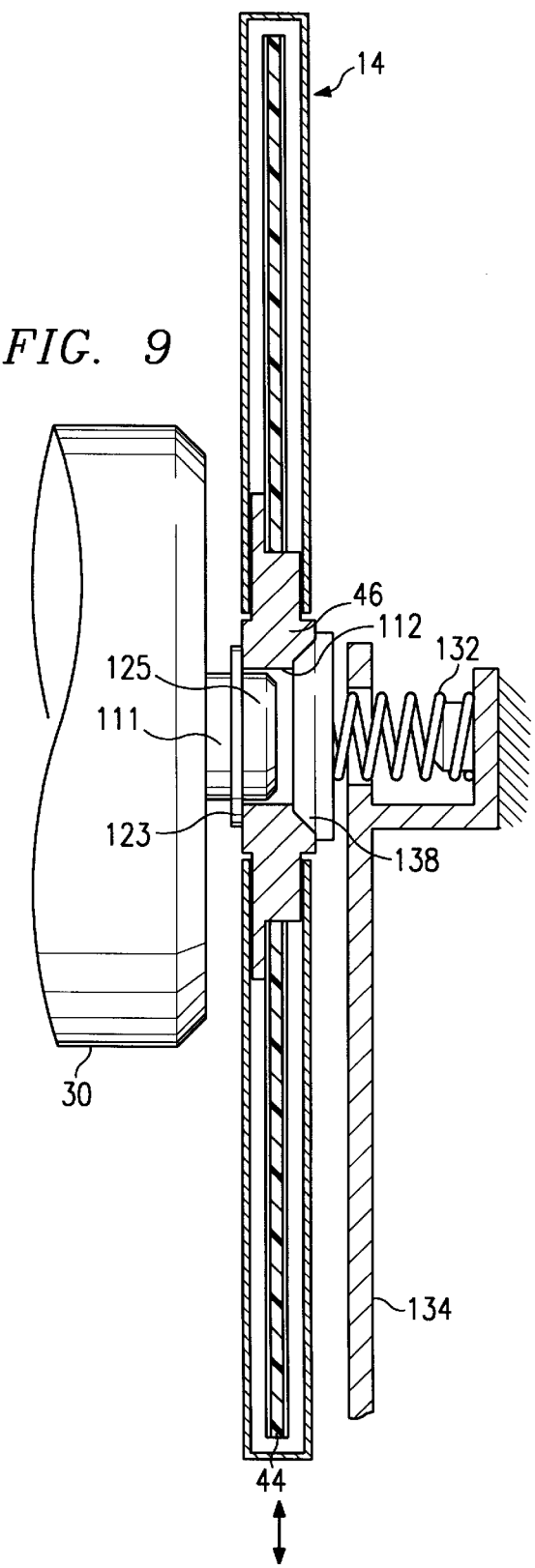
FIG. 9 illustrates a cross-sectional view of the disk and spindle combination.

Referring now to FIG. 9, there is illustrated a detail of a mechanism for securing the hub 46 against the spindle shaft 111. A plate 134, attached to carriage 18, is operable to contain a spring loaded plug 138, which spring-loaded plug 138 is operable to be forced against the opposite side of the hub 46 adjacent the opening 112 from the spindle shaft 111. A spring 132 is operable to apply a pressure of approximately one to two pounds against the hub 46. The plate 134 has spring-loaded rail (not shown) associated therewith that is operable to force the outer surface of the tile 14 away from the plate 134. Another rail on the opposite side of the tile 14 from the plate 134 (this not being shown in FIG. 9) will provide a guide path for the tile 14 in the tile guide (not shown). When the tile 14 is pulled into the tile guide to align the opening 112 and the hub 46 with the spring-loaded plug 138, the tile 14 will be forced away from the plate 134. At this point, the carriage 18 is disposed away from the spindle shaft 111 by approximately 2°. This allows sufficient clearance for the hub 46 to be slipped past the protrusion 125 on the spindle shaft 111. Additionally, the spring loaded plug is also disposed away from the hub 46 to allow the tile 14 to be slid into position. Once aligned with the spring-loaded plug 138 and the spindle shaft 111, the carriage 18 is then rotated the additional 2° to "seat" the hub 46 onto the spindle shaft 111 such that the protrusion 125 is disposed within the opening 112 and the two protrusions 115 and 117 (not shown) and the key 118 can be disposed within the opening 112 to provide a firm rotational positioning of the spindle shaft 111 relative to the hub 46. Additionally, the spring loaded plug 138 is forced against the hub 46. During this positioning, the spindle shaft 111 is rotating so that key 118 finds key surface 116.

Figure 10:
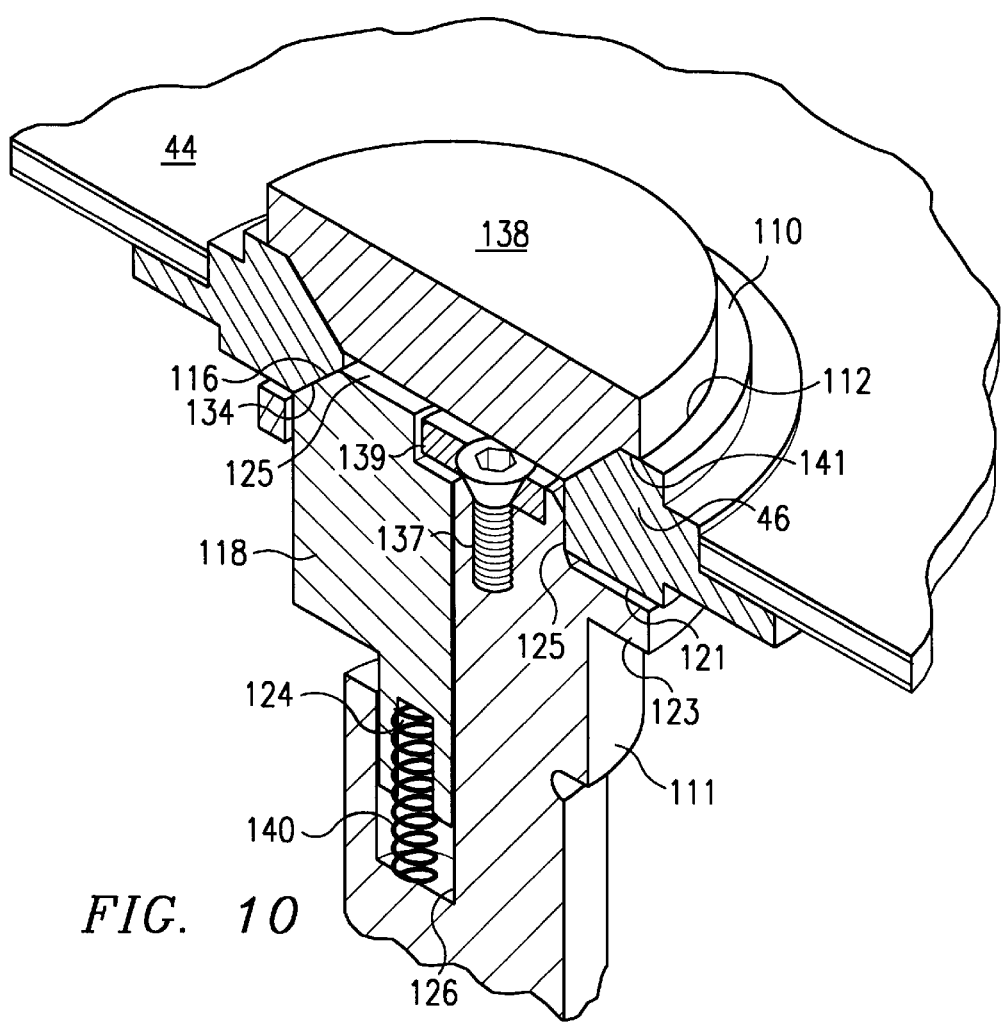
FIG. 10 illustrates a perspective view of the interaction between the media hub and the spindle shaft.

Referring now to FIG. 10, there is illustrated a detail of the spindle shaft 111 mated with the hub 46, with the spring loaded plug 138 shown disposed in place.

The key 118 is held in the opening 126 with a screw 137 and a securing washer 139.

A spring 140 is disposed within the opening 126 in the spindle shaft 111 and the opening 124 in the key 118. This allows the key 118 to slightly compress within the opening 126. The hub 46 is operable to rest on the collar 123 with the two faces 130 and 132 disposed against the two faces of the key surface 116 within the hub 46. The spring-loaded plug 138 has a small shoulder 141 disposed on the periphery thereof that is operable to interface with the outer surface of the hub 46. When inserted into the opening 112, the two faces 130 and 132 (not shown) are forced upward along two surfaces of the key surface 116 in the hub 116 to secure the protrusion 125 within the opening 112 with no rotation allowed.

Figure 10A:
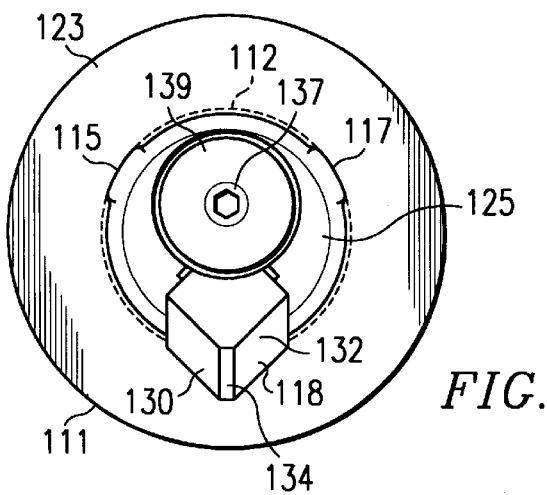
FIG. 10a is illustrates a top view of the shaft of FIG. 10.

Referring now to FIG. 10a, there is illustrated a top view of the spindle shaft 111 with key 118 disposed therein. It can be seen that along the upper portion of the spindle shaft 111, the protrusion 125, extending upward therefrom and operable to insert within the hole 112 of hub 46, has the two raised surfaces 115 and 117 extending radially outward therefrom, which are operable to contact the peripheral walls of the opening 112. The raised surfaces 115 and 117 are disposed approximately 120° away from the key 118. Therefore, the key 118, the raised surface 115 and the raised surface 117 provide three equally spaced points about the interior peripheral surface of the opening 112 to allow the opening 112 to rest thereon. This allows for a more accurate registration.

Referring now to FIG. 11, there is illustrated a detail of the tile 14 when disposed adjacent the spindle shaft 111 (not shown). The tile 14 has an opening 144 disposed therein for allowing access to the media hub 46. A Read/Write slot 150 is disposed on both sides of the tile 14 on one end thereof extending outward from the opening 144. This is to allow for access of the disk 44 therethrough by the Read/Write head 42. The opening 109 is disposed in the lower corner of the tile 14 on the leading edge thereof, the opening 109 having a downward recess 152 for receiving the hook 108 on the distal end of the lever 102 illustrated in FIG. 6a.

The lower surface of the tile 14 is operable to be supported by two support members 147 and 149. The member 147 has an arcuate shape on the end thereof for fitting into notch 146 disposed on the lower edge of tile 14, such that the notch 146 is aligned accurately along the length of the path 92 (not shown). The support member 147 has an abutting edge associated therewith that abuts the side of the tile 14 to limit movement along the arcuate surface. The support member 149 is disposed toward the rear of the tile 114 with a flat surface 151 on which the bottom edge surface of the tile 114 rests. The support member 149 has an abutting surface similar to that of support member 147. Therefore, the tile 114 is aligned via gravity.

Referring to FIG. 11a, there is illustrated a detail of the tile 14 and the opening 150. Since the medium contained within the tile 14 is an optically sensitive medium, it is necessary to ensure that the tile 14 is substantially "light tight". Therefore, the opening 150 must be sealed. To ensure that this occurs, a door 153 is provided that is operable to be opened when the tile 14 is retrieved from the magazine 12. To facilitate this, the door 153 is operated via a bayonet 155 that is disposed on the reciprocating member 94, this not being shown in the previous figure. This bayonet 155 has a slanted extending portion 157 that extends downward at an angle to the front surface of the tile 14. An opening 159 in the door 153 receives the most distal end of the slanted member 157. The slanted member 157 has two surfaces, an upper surface 161 and a lower surface 163. The upper surface 161, upon being inserted into the opening 159, forces the door 153 upward, exposing the opening 150. This occurs because the tile 14 is fixed relative to the movement of the bayonet 155. However, when the bayonet 155 is inserted into the opening 159 fully, the door 153 will be reciprocated upward to expose the opening 150. At this time, the hook 108 on the end of the lever 102 will be inserted into the slot 109. Upon retracting the tile, the relative position of the bayonet 155 and the door 153 therefore remains open. When the tile 14 is again replaced into the magazine 12, the hook 108 is reciprocated out of the slot 109 and the member 94 is urged away from the tile 14. This also urges the bayonet 155 out of the opening 159, this action causing the lower surface 163 to force the door 153 downward. The operation of this door will be disclosed in the related application. A detent 141 is provided as part of the lower surface of magazine 12 to "lock" the tile 14 in place when member 155 is withdrawn and door 153 is lowered.

Referring now to FIG. 11b, there is illustrated a detail of the operation of the door 153 and a locking mechanism that is operable to prevent the door 153 from opening unless the member 155 is inserted in the opening 159. In the preferred embodiment, a portion of the door 153 reciprocates along an edge of the frame of the tile 14. A recess 171 is provided in the frame of the tile 14 for receiving the most distal end of the member 155 when inserted in the opening 159. As described above, the action of sliding the member 155 into the opening 159 forces the door 153 upward. However, a locking member 173 is provided which is a spring member that is an integral part of door 153 and is disposed behind the opening 159 interior to the tile 14. A leading edge diverting plate 175 is provided on the locking member 173 that interacts with the most distal end of the bayonet 155 when inserted into the opening 159. When the most distal end of the bayonet 155 contacts the diverting plate 175, it urges the locking member 173 outward toward the side of the magazine 14. A surface 177 is provided that is operable to interfere with reciprocal motion of the door 153 and the edge of the locking member 173 when the bayonet 155 is not inserted in the opening 159. However, when the bayonet 155 is inserted into the opening 159, it urges the locking member 173 outward toward one face of the magazine 14 such that it would "slide by" the surface 177 and allow the door 153 to reciprocate upward. As such, whenever the bayonet 155 is retracted and the door 153 closed, it is effectively "locked", such that it cannot easily be opened. This therefore provides an added measure of security in maintaining a "light tight" package.

Figure 12:
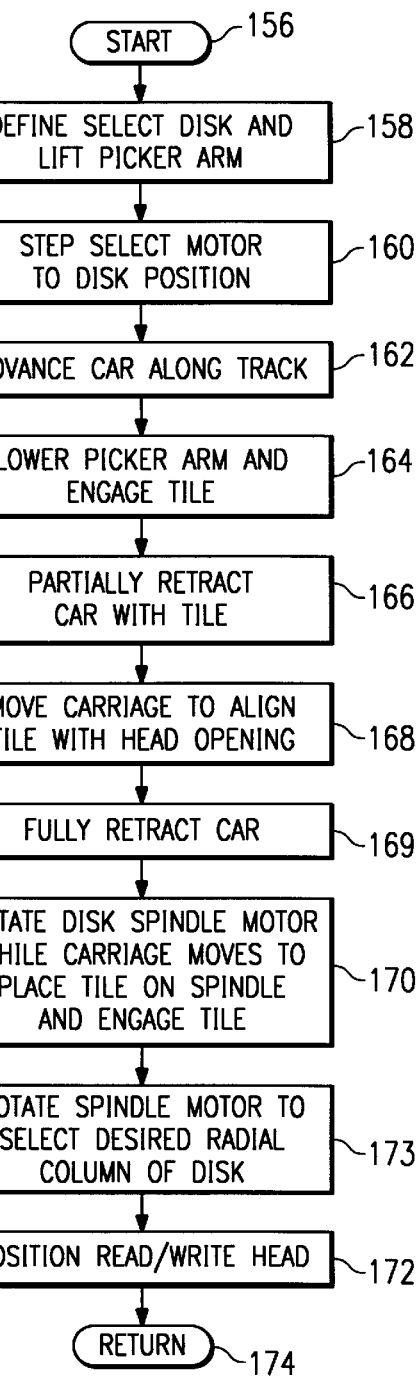
FIG. 12 illustrates a flowchart depicting the selection of a particular tile.

Referring now to FIG. 12, there is illustrated a flowchart depicting the overall operation of the carriage 18, which is initiated at a start block 156 and then flows to a function block 158. Block 158 is the position in the program wherein a select disk is defined. Once defined, the motor 82 is controlled to pivot the carriage 18 to the appropriate location, this indicated by a block 160. The car 34 will then be advanced along the path 92 to the distal end thereof, as indicated by a block 162. The lever 102 will then be lowered to engage the tile 14 as indicated by block 164. The car 34 is then retracted a sufficient amount to remove the tile 14 from the magazine 12, but the car 34 is not fully retracted. This partial retraction is indicated by the function block 166. The program flows to a function block 168 wherein the carriage 18 is then rotated to a position to align tile 14 with the opening slot in the Read/Write head, but not fully rotated. Thereafter, the car 34 is fully retracted, as indicated by a function block 169 to align the spring-loaded plug 138 with the opening 112 in hub 46. Thereafter, the carriage 18 is fully rotated to urge the hub 46 against the spindle shaft 111 with the spindle motor 30 rotating to cause the key to engage the key surface 116 in the hub 46 while the carriage 18 moves to place the tile on the spindle shaft in function block 170. The spindle motor 30 is then rotated to a predetermined position to select an appropriate radial column on the surface of the disk 44, as indicated by a block 173, and then the Read/Write head 42 positioned, as indicated by a block 172. The program then returns, as indicated by a block 174. To return the tile 14 to the magazine 12, this operation is reversed. The reason for partially retracting the car 34 with the tile attached thereto is to allow for minimal movement of the optical Read/Write head 42. If the tile 14 and car 34 were initially fully retracted to a position along the same arc as the spindle of the spindle motor 30, this would require the Read/Write head 42 to be retracted a sufficient amount to "clear" the tile 14 when the tile 14 was rotated into position. By only moving it a sufficient amount to clear the magazine 12, it can then be rotated past the distal end of the optical Read/Write head 42 and then fully retracted into the Read/Write head 42 and into an engaging position with the spindle on the spindle motor 30.

Figure 13:
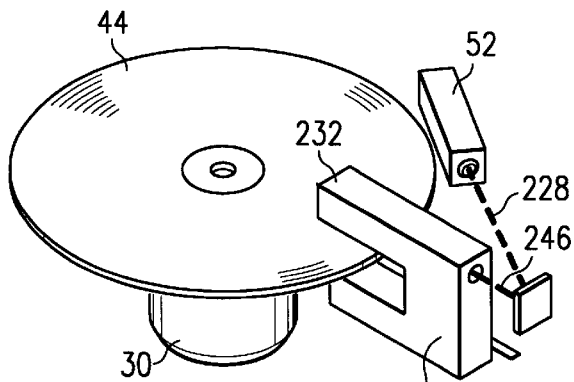
FIG. 13 illustrates a detailed perspective view of the operation of the Read/Write head.
Figure 13B:
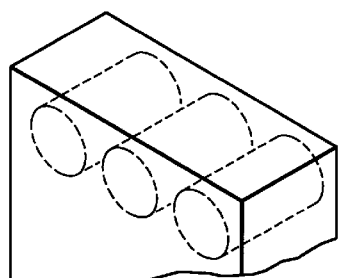
FIGS. 13a and 13b illustrate details of the media.

Referring now to FIG. 13, there is illustrated a perspective view of the Read/Write Head 42 and its operation relative to the disk 44. The disk 44 is operable to be rotated by the disk spindle motor 30 that is operable to selectively position one of a plurality of storage locations 254 within the storage media 44. Digital data is converted into an image that is comprised of a plurality of "white areas" and "dark areas" in a predetermined pattern. This image is converted into a Fourier transform and then stored in the storage media region in the form of an interference grating caused by the interference of a reference beam with an object beam having the data image superimposed thereon. As will be described hereinbelow, a plurality of interference gratings illustrating a plurality of "pages" 211 of data are stored in one of the given storage locations 254. Each of the storage locations 254 are arranged in a predetermined pattern on the holographic storage media 44 and are separated by a predetermined distance. A diagrammatic view of the storage region 254 and the multiple pages 211 of information that can be stored therein is illustrated in FIG. 13b.

Figure 13A:
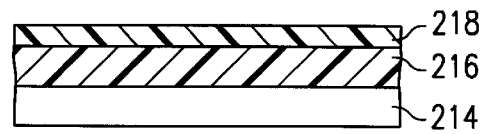

Referring now to FIG. 13a, there is illustrated a cross-sectional diagram of the storage media 44. A substrate 214 is provided which is comprised of high quality optical surface, such as glass. This is approximately 900 microns in thickness. A layer of photopolymer material 216 is disposed on the surface of the substrate 214 to a thickness of approximately 20 microns. The photopolymer material 216 is a material that undergoes photo-induced polymerization. These compositions have been used to form conventional holograms. These are typically fabricated from a viscous or gelatin-like composition which is photo-reactive. When two laser beams intersect in this composition to set up an interference pattern, this causes selective polymerization within the material. These compositions typically contain a polymeric binder, a liquid ethylinically unsaturated monomer and a photoinitiator system. Typically, the layer of viscous or gelatin-like recording material is spun or web coated onto the substrate 214 such as glass to provide a thin coating. A capping layer 218 of material such as Mylar® is then disposed over the gelatin layer. This provides a relatively good optical surface on the upper surface of the gelatin layer, and the glass substrate provides a high quality optical surface on the bottom surface of the gelatin-like recording layer.

When the data beam and reference beam interfere within the storage region 254, the polymerization caused thereby results in the formation of an interference grating. This represents the Fourier transform of the data image that was superimposed on the data beam which, as will be described hereinbelow, can be recovered later as a reconstructed data image by again illuminating the area with a reference beam having substantially the same parameters as the reference beam utilized for the original storage of the interference grating therein.

The optics for both the recording operation and the playback operation are contained within a gantry 220. The gantry 220 is operable to reciprocate along a radial line from the center of the disk 44 outward therefrom under the control of the drive mechanism 48. The drive mechanism 22 is operable to incrementally move the gantry 220 along the radial line such that the optics can be positioned over a predetermined one of the storage locations 254 on the storage media 44. The laser 52 is operable to generate a laser beam 228. The laser 52 is a diode laser operating at a wavelength of 680 nanometers with a power of approximately 30 milliwatts. The laser beam 228 is redirected such that the angle of the beam 228 and the location thereof upon entry to the gantry 220 are substantially the same for all positions along the path. The most distal end 232 of the gantry 220 is therefore moved from the most centrally disposed storage location 254 to the most peripherally disposed storage location 254 on the surface of the media 44 for any position of the spindle motor 30.

Figure 14:
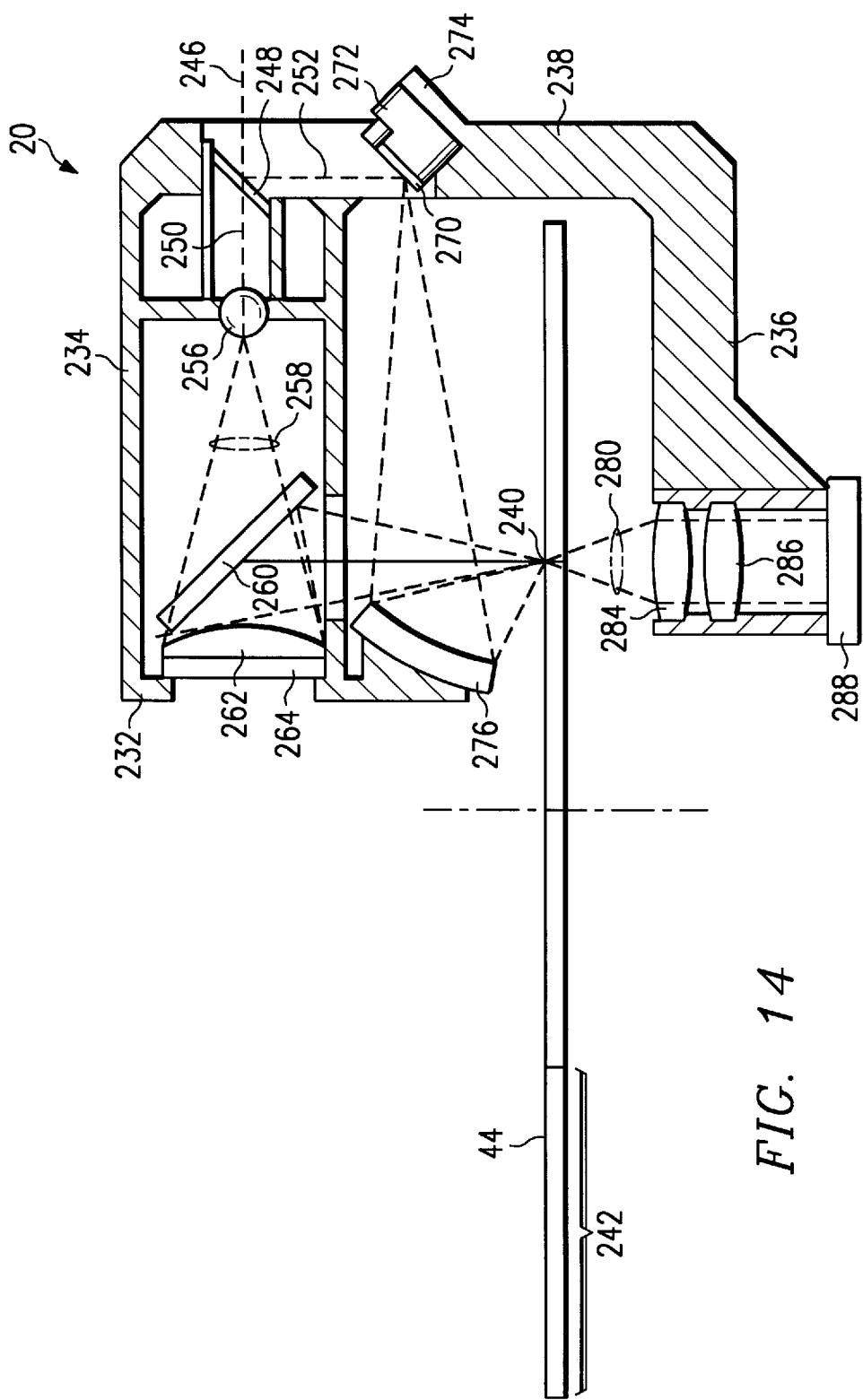
FIG. 14 illustrates a cross-sectional view of the Read/Write head.

Referring now to FIG. 14, there is illustrated a cross-sectional view of the gantry 220. The gantry 220 is comprised of an upper support arm 234 and a lower support arm 236, support arms 234 and 236 connected together by a vertical support arm 238. The upper support arm 234 is operable, in the embodiment of FIG. 14, to support the optics necessary to direct a data beam and a reference beam to a given storage location 240 on the surface of the media 44. It will be seen that only a portion of the media, indicated by a reference numeral 242, is operable to store information thereon. The lower support arm 236 is operable to contain the detection optics for receiving a reconstructed data image, as will be described hereinbelow.

The laser beam 228 is reflected from the mirror 230 as a light beam 246, light beam 246 input to a beam splitter 248. The beam splitter 248 is operable to direct a portion of the beam as a data beam 250 and a portion of the beam 246 as a reference beam 252. The data beam 250 is directed toward an expanding optics device 256, which is operable to expand the data beam 250 into an expanded data beam 258, the optics device 256 comprising a positive lens. The expanded data beam 258 is directed through a polarizing beam splitter 260 to a transform lens 262 which is operable to convert the expanded data beam 258 into a collimated beam which is then directed toward a spatial light modulator (SLM) 264. The SLM 264 is comprised of a plurality of polarizing optical elements such as LCDs that are disposed in an array. The LCDs are operable to reflect the light directed thereto with a predetermined polarization. The relative polarization between the different portions of the beams associated with the different elements of the array define binary bits of data and the array defines an overall data image. The data image represents a "page" of information, this page alterable depending on the input provided thereto (not shown). When the data beam is reflected back from the SLM 264, it is again passed through the transform lens 262 and reflected off of the polarizing beam splitter 260 onto the storage location 240, this representing the Fourier transform at the storage location 240.

The vertical support member 238 is operable to support a rotating mirror 270 on a motive device 272, motive device 272 mounted on a support member 274 extending from the vertical support member 238. The mirror 270 is oriented such that it has a rotational axis extending outward from the drawing of FIG. 14. The reference beam 252 is operable to impinge upon the rotational axis of the mirror 270 and be reflected therefrom at one of a plurality of angles, depending upon the angle of rotation of mirror 270. This will provide a redirected reference beam at one of a plurality of angles that is directed toward an elliptical mirror 276 and reflected therefrom to the storage location 240.

In order that the reference beam for all angles of reflection from the mirror 270 can be directed toward the storage location 240, the elliptical mirror 276 is disposed such that one of its foci is disposed on the rotational axis of the mirror 270 and one of its foci is disposed on the storage location 240. Therefore, all redirected reference beams emanating from the surface of the mirror 270 at the one foci will be redirected toward the other foci at the storage location 240.

During a record operation, the SLM 264 is operable to create a data image which is then focused by the lens 262 to create the Fourier transform and direct it to the storage location 240 via the polarizing beam splitter 260, which is operable to reflect the beam with the data superimposed thereon to the storage location 240. At the same time, the reference beam 52 is directed at one of the predetermined angles to the storage location 240 to interfere with the data beam. This causes an interference grating to be created and stored within the storage media 44 at the storage location 240. It takes approximately 10–30 milliseconds to form an interference grating within the photopolymer material that comprises the storage media 44. During a playback operation, the SLM 264 is controlled such that no light is reflected therefrom. The reference beam 252 is therefore directed at one of the predetermined locations associated with the desired page. This is a function of addressing logic, which is operable to position the mirror 270. Although not described, the addressing logic also selects which one of the storage locations 240 on the surface of the media 44 is selected for both the record and the playback operations.

When the angle for the reference beam 252 is selected, the storage location 240 is illuminated, resulting in the page of information associated with that angle being reconstructed as a reconstructed data beam 280. The reconstructed data beam 280 is then passed through reconstruction lens 284 and 286, which is operable to collimate the light down onto a detector array 288, which is comprised of an array of detector elements such as CCDs. These CCDs, although not shown, are disposed in the array such that there will be at least one CCD element for each binary data bit in the original data image that was formed by the SLM 264. The detector array 288 is disposed such that the reconstructed data beam 280 will be imaged on the surface thereof.

Figure 15:
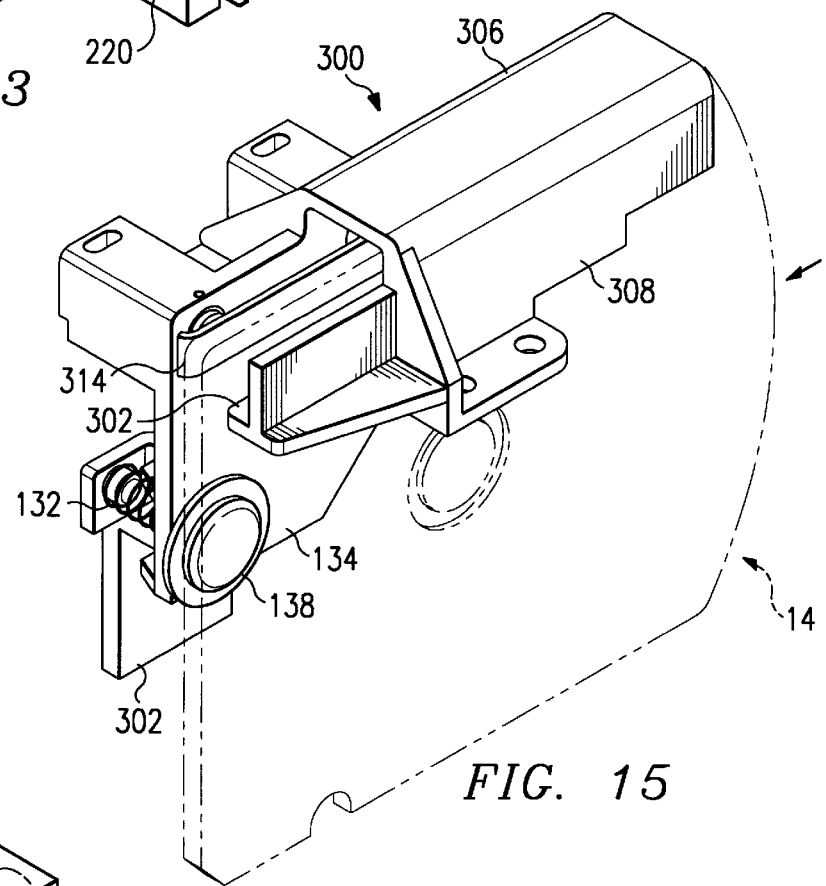
FIG. 15 illustrates a plan view of the tile guide.

Referring now to FIG. 15, there is illustrated a perspective view of a tile guide 300, which is operable to be disposed on the carriage 18 and mounted on the mounting block 99, as described above with reference to FIG. 6. The tile guide 300 is operable to hold the tile 14 in place within the path 92 on the carriage 18 during transport thereof The guide rail 300 has a vertical support bracket 302 which extends upward to provide the first vertical plate 134 which is disposed on one side of the tile 14 when contained therein. An upper bracket 306 extends over the tile 14 to interface with a second vertical plate 308 on the opposite side of the tile 14 from the vertical plate 134. A front view of the tile guide 300 is illustrated in FIG. 16 and a top view of the tile guide 300 is illustrated in FIG. 17.

Figure 16:
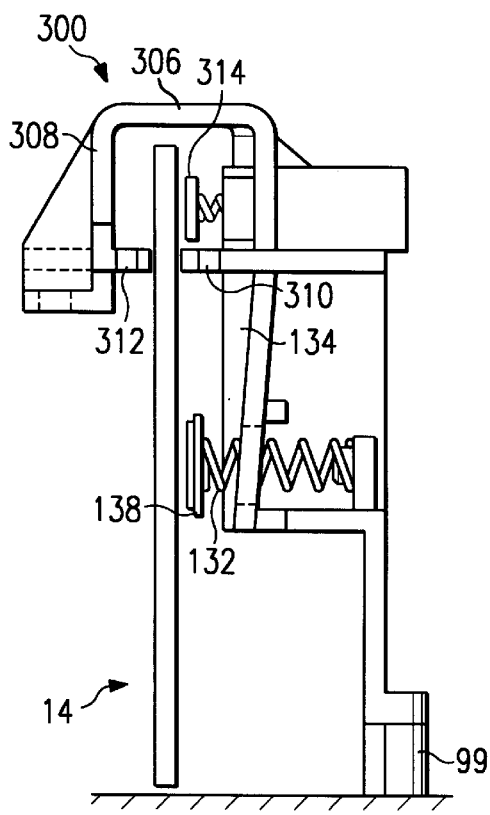
FIGS. 16, 16a and 17 illustrate front and top views, respectively, of the tile guide.
Figure 17:
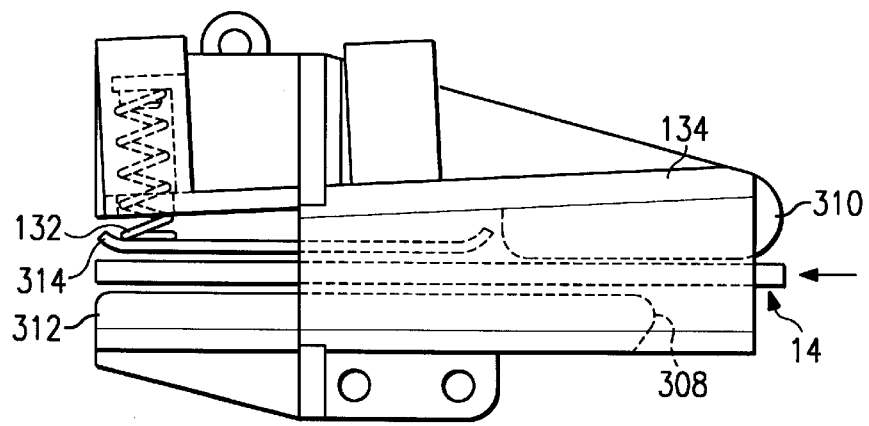

With reference to FIGS. 15–17, the vertical plate 134 has a first fixed rail 310 extending inward toward the tile 14 to coact with the edge thereof, the first fixed rail 310 only extending a portion of the way along the length of the guide 300. A second fixed rail 312 extends inward from the vertical plate 308 toward the tile 14 and is operable to coact with the side thereof. A spring-loaded rail 314 is spring-mounted to the vertical wall 134 and is operable to extend inward against the surface of the tile 14 when the tile 14 is disposed on the spindle shaft 111. The distance between fixed rails 310 and 312 is greater than the thickness of the tile 14, such that the tile 14 can move therein. The spring-loaded plug 138 is disposed on the vertical wall 134 and extends outward therefrom and proximate to the rear portion of the tile guide 300. It is mounted onto the tile guide 300 by the spring 132.

In operation, the tile 14 is moved into the opening between the fixed rails 310 and 312. However, the tile 14 is only disposed a portion of the way into the tile guide 300, such that the hub 46 is not in contact with the spring-loaded plug 138. When not rotated against the hub 46, the edge of the tile 14 will clear the outer surface of the spring-loaded plug 138. This is the position of the tile 14 when initially extracted from the magazine 12 and pulled into and partially along the path 92. In this position, the tile 14 has completely cleared the magazine 12 and ready for transport over to the Read/Write head 48.

When the carriage 18 has been rotated to a position which is approximately 2° less than the fully rotated position, the tile 14 is pulled forward by the car 34 to a position such that the hub 46 is aligned with the spring-loaded plug 138 and the trailing edge of the tile 14 clears the fixed rail 310. It is important to note that the tile guide 300 is located relative to the spindle motor 30 and the spindle shaft 111, such that the rotational axis of the spindle shaft 111 is aligned with the rotational center of the spring-loaded plug 138 and the spring loaded plug 138 will therefore be in a common arc with the spindle shaft 111 during rotation of the carriage 18. As such, when the spring-loaded plug 138 is seated into hub 46, the rotational center of hub 46 at full rotation of the tile guide 300 and carriage 18 is aligned along the rotational axis of the spindle shaft 111. At this point, the carriage 18 is then rotated the additional 2° such that the hub 46 is then pressed onto the spindle shaft 111 and the spring loaded plug 138 seated against the opening 112 of hub 46.

Figure 16A:
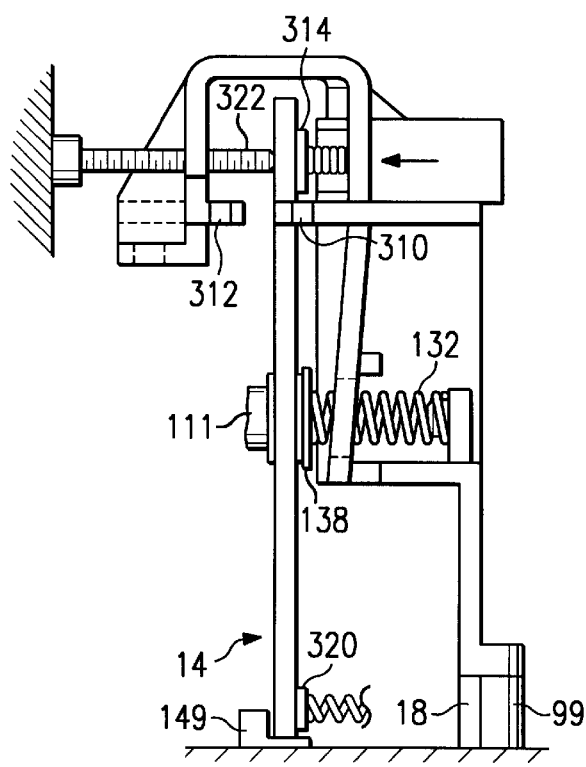

When the carriage 18 is fully rotated against the hub 46 with the tile 14 fully retracted into the path 92, and also within the tile guide 300, the tile 14 is so positioned that the disk 44 "floats" within the tile 14 and does not contact the surfaces thereof In order to ensure that tile 14 is so positioned, when the carriage 18 and the tile guide 300 are fully rotated, the trailing edge of the tile 14, described above, clears the leading edge of the first fixed rail 310 and the spring loaded rail 312 is operable to contact the side of the tile 14 opposite to the motor 30. During rotation, the spring loaded plug 138 is urged against the hub 46 and the spring loaded rail 314 is urged against the outside surface of the tile 14. Additionally, as illustrated in FIG. 16a, two spring loaded tabs, only one of which, a tab 320, is shown, are urged against the bottom edge of the tile 14 on the same side as the spring loaded rail 314. This forces the bottom edge of the tile 14 against the abutting edges of both support member 147 (not shown) and support member 149. Additionally, a stop 322, which is fixed to the motor 30 (not shown) contacts the side of the tile 14 on the upper end thereof diametrically opposite to the spring loaded rail 314. The spring loaded tab 320 is disposed on the carriage 18 on the lower surface thereof with the stop 322 and the support member 149 positionally located relative to the tile 14 when the carriage 18 is in the fully rotated position such that the disk 44 is not contacting the interior side of the tile 14. This therefore provides three points on the side of the tile 14 proximate to the motor 30 and three points on the opposite side of the tile 14 with which to hold and position the exterior of the tile 14 relative to the interior thereof and the disk 44.

In summary, there has been provided a media changer for accommodating a plurality of holographic storage media disks. Each of the disks is contained within a tile, which tiles are stored in a magazine. The magazines are located such that they are directed along an arcuate path. A pivoting carriage is provided which has one end thereof disposed on a pivot point and the other end thereof operable to pivot about an arc that allows each of the tiles to be disposed along the radial path of the carriage. A reciprocating member is disposed within the carriage which is operable to reciprocate upward along the length of the carriage from the pivot point, grasp a selected one of the tiles and retract the tile onto the carriage. The tile is then moved into position with a spindle motor. A spindle shaft has a key disposed therein with a key surface that mates with a key surface in the hub of the tile to virtually prevent rotation of the spindle shaft and hub relative to each other. The spindle motor is operable to position a radial column on the disk beneath a predetermined radial access slot within the tile. A Read/Write head is then operable to be reciprocated over the slot to a particular position along the radial column to select one of a plurality of storage locations, the storage locations arranged in radial columns and arcuate rows on the disk.

Although the preferred embodiment has been described in detail, it should be understood that various changes, substitutions and alterations can be made therein without departing from the spirit and scope of the invention as defined by the appended claims.

What is claimed is:

1. An apparatus for holding and positioning a disk to a precise radial location, comprising:

a hub disposed at the rotational center of the disk and having a hole disposed therein with a cylindrical wall and having a key notch on the peripheral edge of said cylindrical wall on one surface of said hub, said key notch having a surface that extends from a point radially outward from the associated peripheral edge to a point on the cylindrical wall of said hole and not extending to the other surface of said hub diametrically opposite said one surface said key notch having a pair of inclined surfaces, relative to said hole, forming an apex on said one surface and an apex within said hole;

a rotatable shaft rotatable to a defined radial position;

a spindle disposed in the end of said rotatable shaft and having a shape substantially conforming to that of said hole and operable to be inserted into said hole from the side proximate said key notch;

a key disposed in said spindle proximate to the distal and peripheral portion thereof with an extended portion thereof extending radially outward from said spindle, said extended portion of said key having a shape that substantially conforms to the surface of said key notch to slidingly engage the surface of said key with the surface of said key notch, said key operable in relationship to said spindle to conform to the shape of said key notch for various positions of said spindle along the longitudinal axis of said hole and to maintain said spindle in substantially the rotational center of said hub while maintaining substantially no relative rotational movement between said spindle and said hub as said spindle reciprocates within said hub and a spring disposed within said spindle operable to bias said key into contact with said key notch of said hub along a direction parallel to the longitudinal axis of said hole.

2. The apparatus of claim 1, wherein said key notch surface is comprised of two surfaces, a first and second surface, which are flat surfaces disposed adjacent each other such that the edges thereof form an apex with said first and second surfaces extending from said point disposed radially outward from the associated peripheral edge to said point on the cylindrical wall of the hole and wherein said extended portion has first and second surfaces which are longer than said first and second surfaces of said key notch with an apex formed at the edges of said first and second surfaces of said extended portion.

3. The apparatus of claim 2, wherein said spindle has a key receptacle disposed therein and said key is operable to be slidingly disposed within said key receptacle and reciprocate therein along the longitudinal axis of said spindle and further wherein said spring disposed between said key and said key receptacle such that said key is spring forced outward from said key receptacle parallel to the longitudinal axis of said spindle such that the apex of said extended portion slides along the apex of said key notch whenever said spindle reciprocates within said hole.

4. The apparatus of claim 3, wherein said spindle has first and second lateral protrusions disposed on the outer surface thereof with said first and second protrusions and said key disposed substantially equidistant from each other such that when said spindle is disposed in said hole, said first and second protrusions slidingly contact said cylindrical wall and said extended portion contacts said key notch for substantially all longitudinal positions of said spindle within said hole.

5. The apparatus of claim 4, wherein said spindle has a diameter that is less than the diameter of said hole.

6. The apparatus of claim 1, wherein said spindle has first and second lateral protrusions disposed on the outer surface thereof with said first and second protrusions and said key disposed substantially equidistant from each other such that when said spindle is disposed in said hole, said first and second protrusions slidingly contact said cylindrical wall and said extended portion contacts said key notch for substantially all longitudinal positions of said spindle within said hole.

* * * * *